United States Patent [19]
Yuyama et al.

[11] Patent Number: 6,039,209
[45] Date of Patent: Mar. 21, 2000

[54] AMPULE FEEDER

[75] Inventors: Shoji Yuyama; Yasuhiro Shigeyama, both of Toyonaka, Japan

[73] Assignee: Kabushiki Kaisha Yuyama Seisakusho, Osaka, Japan

[21] Appl. No.: 09/046,641

[22] Filed: Mar. 24, 1998

[30] Foreign Application Priority Data

Mar. 25, 1997 [JP] Japan .................................... 9-072042

[51] Int. Cl.[7] .................................................... B23Q 7/12
[52] U.S. Cl. .......................... 221/171; 221/192; 221/254
[58] Field of Search ............................ 221/90, 164, 163, 221/171, 190, 192, 263, 268, 254, 312 R, 288

[56] References Cited

U.S. PATENT DOCUMENTS 5,704,516   1/1998   Yuyama .................................. 221/171

FOREIGN PATENT DOCUMENTS 405325012   12/1993   Japan ...................................... 221/254

Primary Examiner—Kenneth W. Noland
Attorney, Agent, or Firm—Wenderoth, Lind & Ponack, L.L.P.

[57] ABSTRACT

An ampule feeder which is simple in structure and which can discharge ampules one by one with a high degree of efficiency without the possibility of clogging. The feeder includes an ampule container having a bottom plate that is pivotable in one direction. Ampules stored randomly in the container are moved onto an inclined top surface of an ampule receiver and raised. When the ampule receiver rises to its highest level, the ampules slide on its surface and drop onto a conveyor belt of a dispenser provided outside of the side wall of the ampule container. Ampules are thus discharged by the dispenser. As the number of ampules remaining in the container decreases, the bottom plate is inclined in increments to prevent the ampule receiver from rising with no ampules on its top surface.

8 Claims, 6 Drawing Sheets

AMPULE FEEDER

BACKGROUND OF THE INVENTION

This invention relates to an ampule feeder for feeding according to prescriptions ampules and vials containing injection medication and housed randomly in a container.

Unexamined Japanese patent publications 7-300237, 8-230826 and 8-225140 disclose ampule feeders for feeding ampules housed randomly in a container.

The ampule feeder disclosed in the first publication has a head disposed under the container bottom and having a recessed top formed with a groove. The head is pushed up by a cylinder head to lift an ampule on the top of the head. The ampule thus lifted is sucked by a sucker and moved onto a conveyor.

The ampule feeder of the second publication has an ampule container with two cells partitioned by a movable partitioning plate so that the volumes of the cells are variable. A pusher rod with an ampule-receiving head is provided in each cell. The head has an inclined top surface. When each rod is pushed up to a predetermined height with an ampule on the inclined top surface of the head, the top inclined surface of the head aligns with a conveyor line, so that the ampule slides down into the conveyor line.

The ampule feeder of the third publication has an ampule feeder with an inclined bottom. A pusher having a inclined top is vertically movably inserted through a hole formed in the bottom of the container. When the pusher is pushed up to a predetermined height with an ampule on the inclined top, the inclined top aligns with an inclined platform, so that the ampule slides down onto the platform. The ampule on the platform is now pushed up by another pusher and discharged. Ampules can thus be discharged one by one without the possibility of being broken.

Ampule feeders of this type have an advantage in that there is no need to arrange ampules in containers in an orderly manner. Thus, many of today's ampule feeders are of this type.

But this type of ampule feeders have their own problems. One problem is that the pusher means is frequently pushed up with no ampule on the head. This happens because ampules put in the container in an disorderly manner tend to get stuck and deadlocked especially near the pusher.

This problem is solvable if a plurality of ampules arranged in an orderly manner are raised by a pickup means and discharged one by one. Such a pickup means has to have a length at least 1.5 times the length of ampules and a width suitable to raise a plurality of ampules in an orderly aligned state, i.e. a width substantially equal to the ampule diameter.

In this arrangement, while the ampule container having a horizontal bottom is filled with ampules, ampules will move little by little toward the pickup means. But as the number of ampules in the container decreases and the height of the heap of ampules lowers, the ampules cannot move toward the pickup means. In order to move ampules toward the pickup means even in this state, the container has to have an inclined bottom.

But such an inclined bottom reduces the volume of the ampule container. That is, an ampule container with an inclined bottom cannot store as many ampules as an ampule container with a horizontal bottom.

An object of this invention is to provide an ampule feeder which is simple in structure and which can discharge ampules one by one with high efficiency without the possibility of clogging.

SUMMARY OF THE INVENTION

According to this invention, there is provided an ampule feeder comprising an ampule container having a bottom plate inclinable in one direction about an axis extending along one edge of the bottom plate. The container is capable of randomly accommodating a plurality of ampules. An ampule receiver is vertically movable along a side wall provided at the one edge of the bottom plate and has a top surface substantially as wide as the ampule diameter for receiving ampules and arranging them in order. A dispenser means is provided for discharging ampules on the top surface of the ampule receiver in a direction in which ampules on the top surface are arranged. Also, a control means is provided for detecting ampules discharged by the dispenser means and adjusting the inclination angle of the bottom plate according to the number of ampules remaining in the ampule container.

With this arrangement, ampules are arranged in order and discharged reliably one by one.

While a sufficiently large number of ampules remain in the container, ampules will roll down onto the ampule receiver by gravity. When the ampule receiver is raised with ampules put on its top surface having a width substantially equal to the ampule diameter, any ampules on the receiver protruding from the top surface drop. Thus, ampules remaining on the ampule receiver are arranged in order.

Thus, ampules raised by the ampule receiver are discharged one by one from a discharge port by the dispenser. The dispenser may include means for discharging ampules arranged in a row on the ampule receiver in the direction of the row or means for moving ampules to the outside of the side wall of the ampule container and then discharging ampules in parallel to the direction in which they are arranged.

As the number of ampules remaining in the container decreases, ampules will stop rolling toward th e ampule receiver. Thus, the ampule receiver rises with no ampules thereon. When this situation is detected, the bottom plate of the container is inclined by a predetermined angle so that ampules will roll toward the ampule receiver. This is repeated every time the ampule receiver rises empty-handed until the bottom plate is inclined to a predetermined maximum angle. It is thus possible to discharge all the ampules in the container.

Other features and objects of the present invention will become apparent from the following description made with reference to the accompanying drawings, in which:

DETAILED DESCRIPTION OF THE PREFERRED EMBODIMENT

Figure 1:
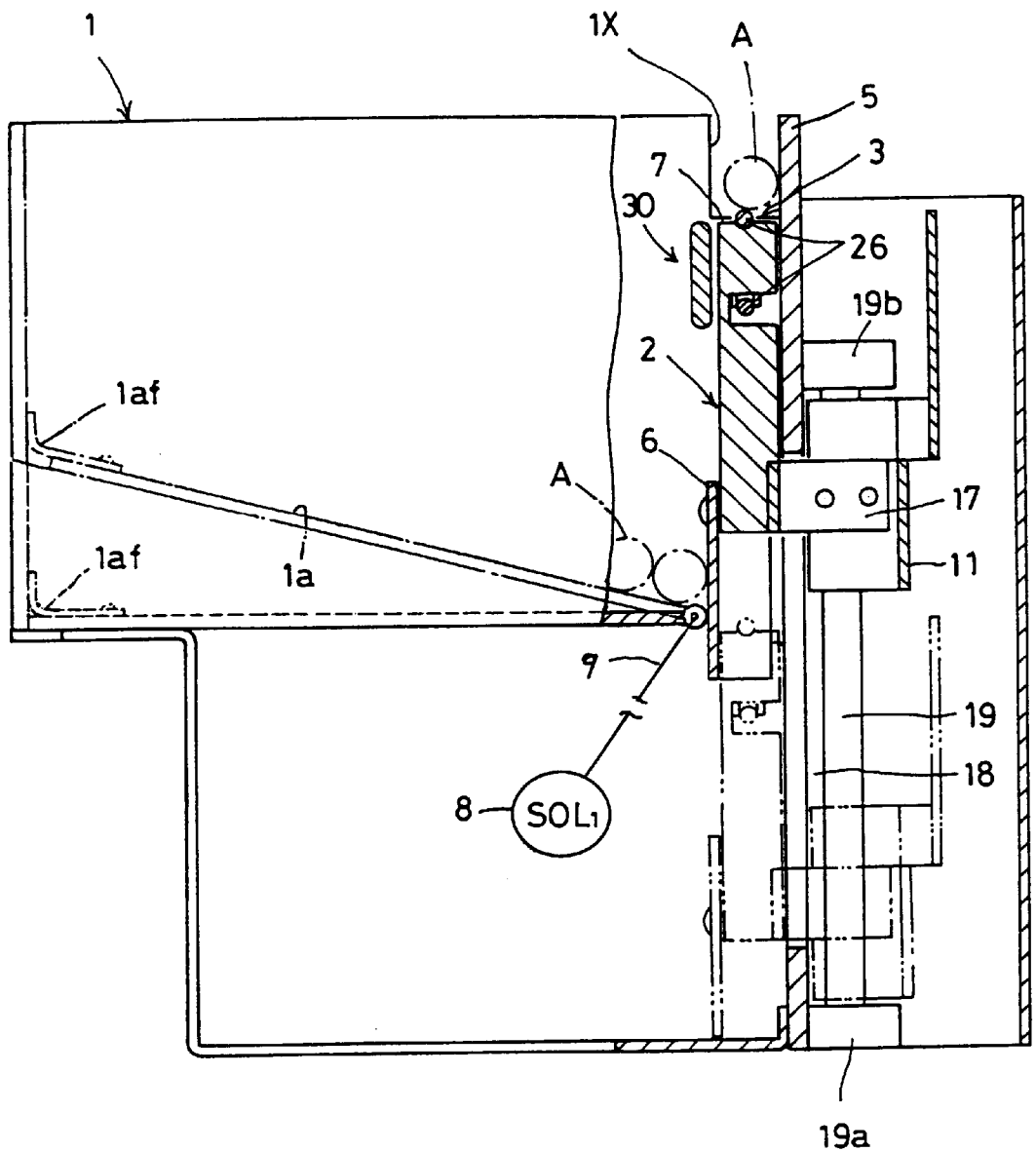
FIG. 1 is a partial sectional view of an ampule feeder embodying the present invention.
Figure 2:
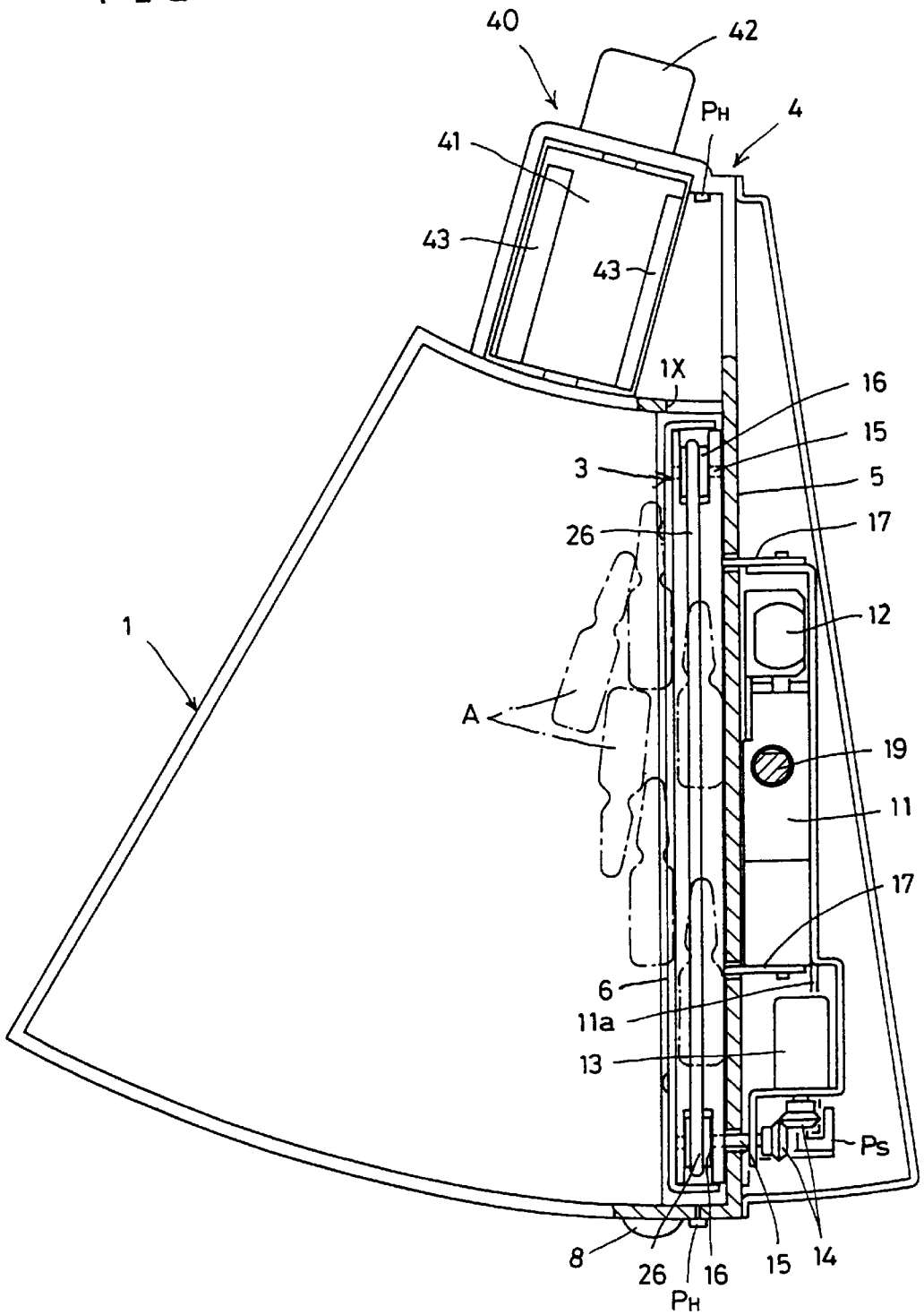
FIG. 2 is a plan view of the ampule feeder shown in FIG. 1.
Figure 3:
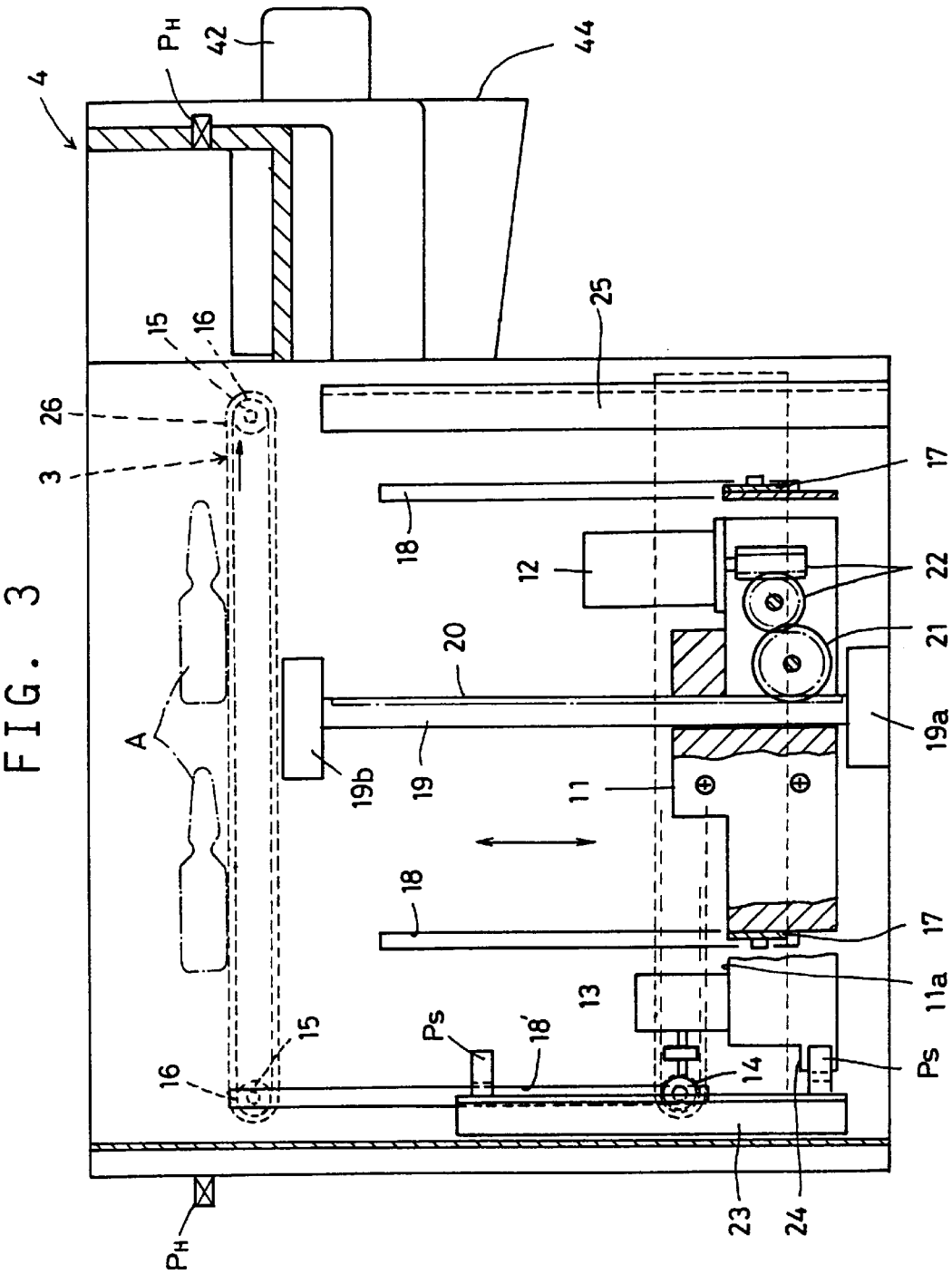
FIG. 3 is a side view of the ampule feeder shown in FIG. 1.

An embodiment of this invention is described with reference to the drawings. Referring to FIGS. 1–3, the ampule feeder of this embodiment comprises an ampule container 1, an ampule receiver 2 provided on one side of the container 1, and an ampule dispenser 3 provided on the top of the ampule receiver 2. As shown in FIG. 2, an ampule catcher 4 is provided outside the discharge port of the container 1. An ampule discharge means 40 with a rotor 41 is provided by the side of the ampule catcher 4.

The ampule container 1 holds many ampules in a random manner and has a bottom plate 1a having one end supported on a rotary shaft 9 so as to be pivotable between a horizontal position and an inclined position. A solenoid 8 is coupled to the rotary shaft 9 to pivot the plate 1a by rotating the shaft 9. The ampule receiver 2 is vertically slidable between a shutter 6, provided at the end of the bottom plate 1a, and a side wall 5 outside the shutter 6, guided by the inner surface of the side wall 5.

The shutter 6 has its top end connected to the bottom end of the ampule receiver 2. It prevents ampules A from dropping into the space under the ampule receiver 2 when it is raised. A cover 1af made of a resilient material such as rubber or cloth is provided at the free end of the bottom plate 1a for the purpose of closing the gap formed between the plate 1a and the side wall of the container 1 when the plate 1a is inclined.

The ampule receiver 2 is substantially of the same length as the side wall 5 and is at least 1.5 times longer than ampules. Its thickness is substantially the same as the diameter of an ampule.

The ampule receiver 2 is moved up and down by a drive unit provided outside the side wall 5. As shown in FIG. 3, the drive unit includes a support plate 11 which is movable up and down by a motor 12. The plate 11 carries a conveyor motor 13 for the dispenser 3 and has an overhang 11a which supports a pulley 16 driven by a pulley shaft 15 coupled to the output shaft of the motor 13. A pair of arms 17 are mounted to both ends of the support plate 11. The arms 17 extend through vertical guide grooves 18 formed in the side wall 5 and are coupled to the ampule receiver 2.

A vertical rod 19 slidably extends through the support plate 11 at its center. It has on one side thereof a rack 20 in engagement with a speed reducer comprising a pinion 21 and gears 22. The support plate 11 is moved up and down by the motor 12 through the speed reducer. The rod 19 has its top and bottom ends supported by support members 19a and 19b.

Two sensors PS are mounted on a sensor mounting plate 23 at its top and bottom. When a detection plate 24 provided at the end of the overhang 11a passes by either sensor PS, light is interrupted, so that the top or bottom sensor PS detects that the ampule receiver 2 is at the highest or lowest level. The receiver 2 is thus stopped at the highest and lowest positions. Also, reference numeral 25 denotes a mounting plate.

Figure 4:
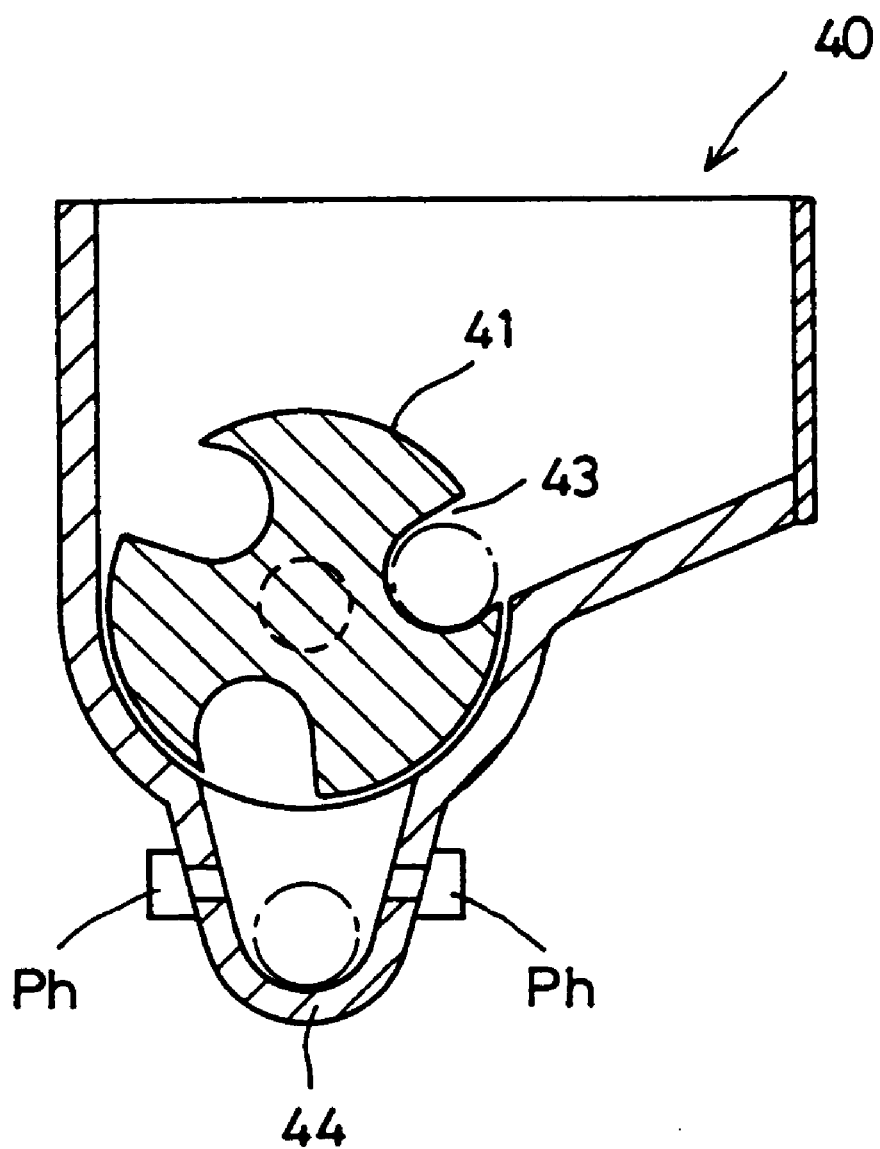
FIG. 4 is a sectional view of a discharge means.

The dispenser 3 of the embodiment is a conveyor means including an endless belt 26 trained around pulleys 16 and driven by the motor 13 to discharge ampules A arranged on the belt in its feed direction. The ampule catcher 4 has its bottom plate slightly inclined toward the discharge means 40 to feed discharged ampules A into the discharge means 40. Ampules A roll on the bottom plate of the receiver 2, fit one after another into grooves 43 formed in the rotating rotor 41 of the discharge means 40, and are discharged one by one through a discharge port 44 as shown in FIG. 4.

As shown, a pair of sensors PH are provided at the discharge port 44 to detect the passage of ampules.

Figure 5:
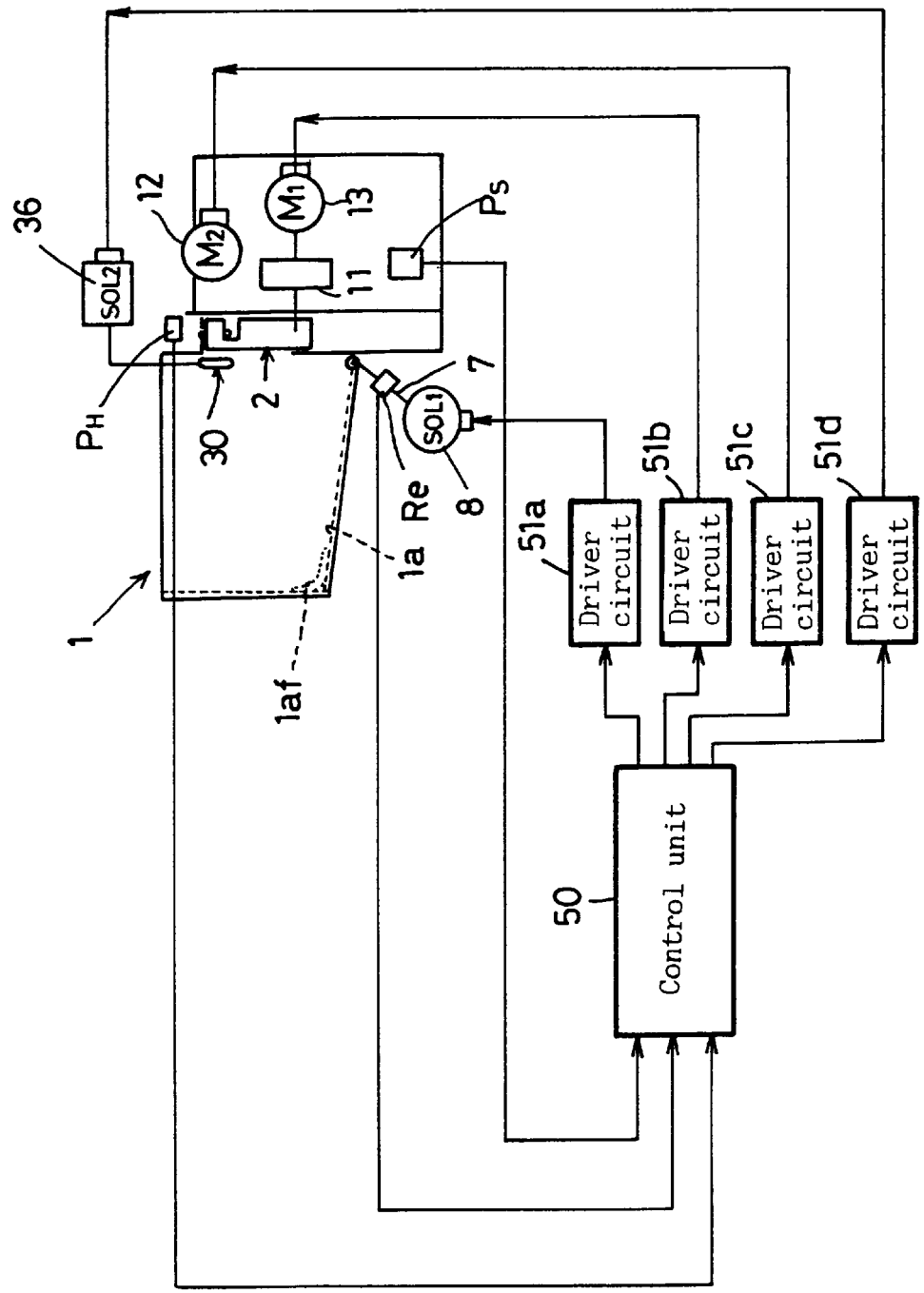
FIG. 5 is a block diagram of a control circuit for controlling the inclination angle of the bottom plate of the ampule container.

FIG. 5 is a block diagram of a control circuit for controlling the bottom plate 1a of the container 1, ampule receiver 2, dispenser 3, and an ampule dropper 30. The control circuit has a control unit 50 for controlling solenoids 8, 36 and motors 12, 13 based on signals from a rotary encoder Re for the solenoid 8, and the sensors PS and PH. Reference numerals 51a–51d are driver circuits.

An ampule sensor PH comprising a light emitter and a light receiver is provided outside the dispenser 3. The sensor PH detects any ampule on the belt 26 from the fact that light emitted from the emitter toward the receiver is interrupted by the ampule on the belt.

The ampule dropper 30 serves to drop any ampules A that stand erect on the ampule receiver 2 so that all the ampules are fed in an orderly manner.

The operation of the ampule feeder of the first embodiment is described. Many ampules A are stored randomly in the container 1. In the initial state, the bottom plate 1a is horizontal. In response to a trigger signal, the control unit lowers the ampule receiver 2 to bring its top surface 7 to the same level as the bottom plate 1a.

Some of the ampules A on the bottom plate 1a thus move onto the top surface 7 of the ampule receiver 2. In this state, the ampule receiver 2 begins to rise. While the ampule receiver is rising, any ampules that are only partially on the top surface 7 are dropped, so that only ampules that are completely on the top surface 7 and thus arranged in an orderly manner are kept on the top surface 7. However, some ampules may be kept on the top surface 7 while standing upright. The ampule dropper 30 drops such ampules.

When the ampule receiver 2 reaches the highest level, ampules on the endless belt 26 mounted in the ampule receiver 2 are fed by the belt 26 and discharged from the delivery end of the belt 26 into the ampule catcher 4. From the ampule catcher 4, ampules are fed into the are discharge means 40 and discharged therefrom.

The top surface of the ampule receiver 2 is flat. The endless belt 26 as the dispenser 3 is mounted on the top of the ampule receiver 2. The ampule feed path of the dispenser 3 extends along the top edge of the ampule receiver 2 in the direction in which ampules are arranged end to end on the ampule receiver 2. Thus, there is no need to provide a feed path leading to the outside of the side wall 5. The side wall 5 extends to the same height as the other side wall of the container 1. But a cutout IX is formed in the side wall 5 at a portion where the ampule feed path intersects the side wall extending perpendicular to the side wall 5 and thus provides a dispensing port.

While being raised by the ampule receiver 2, ampules are arranged in order. In the raised position, ampules are fed horizontally by the endless belt 26 and discharged.

Figure 6:
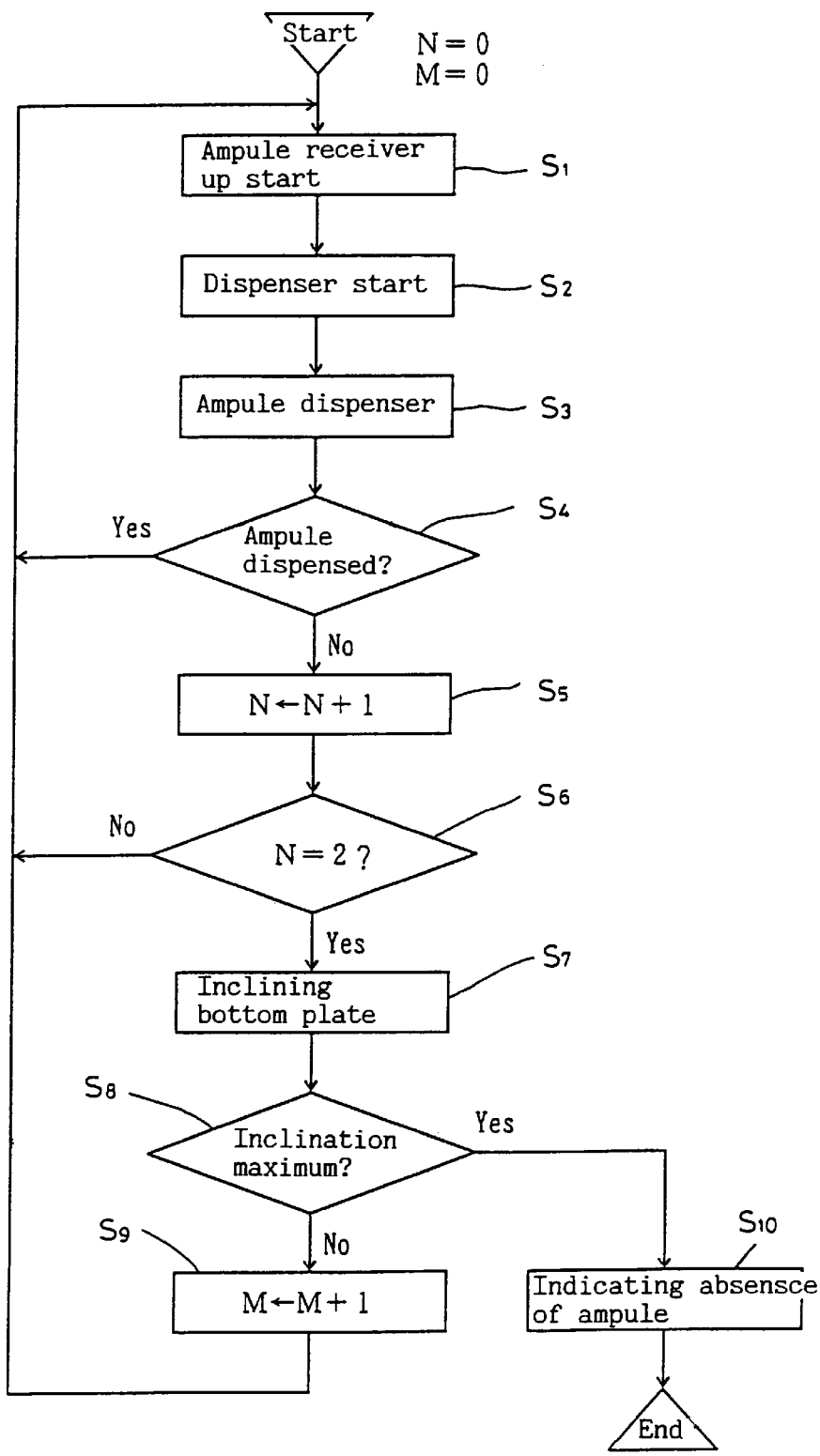
FIG. 6 is a flowchart illustrating the operation of the ampule feeder.

In the initial state, the bottom plate 1a is kept in the horizontal position, so that the container 1 can store ampules to its full capacity. While there are still many ampules remaining in the container, some ampules are pushed by other ampules onto the ampule receiver 2 even if the bottom plate 1a is not inclined. Thus, the bottom plate 1a is initially kept in the horizontal position. When the number of ampules remaining in the container 1 decreases to such an extent that no ampules are pushed by other ampules onto the ampule receiver 2, the bottom plate 1a is inclined to let ampules roll down the bottom plate 1a onto the ampule receiver 2. The bottom plate 1a is inclined in the manner to be described below with reference to the flowchart of FIG. 6.

In Step S1, the ampule receiver 2 begins rising. In Step S2, the dispenser 3 is activated to discharge ampules. In S3, ampules are detected at the discharge port. In S4, the computer asks if ampules are being dispensed. This routine is repeated as long as ampules are being dispensed.

If no ampule is dispensed and the ampule receiver 2 swings and misses, i.e. rises empty-handed, one is added to the strike count in S5. If two strikes are called in Step S6, the solenoid 8 is activated in Step 8 to incline the bottom plate by a predetermined angle.

As more ampules are discharged, the ampule receiver will again swing and miss. Thus, the bottom plate is inclined by another predetermined angle. In this way, the bottom plate is inclined by predetermined increments every time the ampule receiver swings and misses.

In S8, the computer asks if the inclination angle of the bottom plate is at a maximum, and if it is, calls the game over and indicates that no ampules remain in the container in S10. In order to discharge ampules with higher accuracy, the number of ampules discharged may be counted by a rotor counter shown in FIG. 4.

The rotor counter has grooves complementary in shape to ampules and each has a sensor light passing groove extending obliquely across the groove. With the rotor in rotation, ampules dispensed are received one by one into the grooves and discharged one at a time.

The sensors in this case are however slightly different from that shown in FIG. 4. When the rotor is in any of the ampule introducing, detecting and discharging steps, the grooves of the rotor stop at positions corresponding to the respective step. While the rotor is at a stop, the sensors extending obliquely across the respective grooves determine whether or not ampules are in the respective grooves. If no ampule is found in any groove, the counter for counting the discharged ampules does not count. The detection sensors are usually light sensors comprising a light emitter and a light receiver. When light emitted from the emitter toward the receiver is interrupted, the sensor determines that there is an ampule between the emitter and the receiver.

But such light sensors are ordinarily unable to detect unlabled transparent ampules containing clear liquid drug if the sensor line is arranged in the longitudinal or diametric direction of ampules. Even if the luminosity is adjusted with a narrow tolerence, detection errors can still occur. Though depending upon the ampule diameter, ampules can be detected with greater reliability by reducing the incident angle to preferably 60° or less. Even at the incident angle of 60–85°, detection accuracy improves to a certain degree. If the incident angle is too steep, the distance between sensors increases and it becomes increasingly difficult to detect ampules. Thus, the incident angle is preferably set in the range from 55 to 30°.

In the above description, sensors are used to count ampules discharged. But such sensors may also be used to detect ampules remaining or moving ampules. Also, microswithes may be used as sensors for detecting ampules discharged. This detection unit can also be used as the ampule introducing and discharge units, and can detect moving ampules.

In the above embodiment, the reference position of the bottom plate of the ampule feeder is the horizontal position. But the reference position may be set at a negative angle, e.g. −15° to −10°. In this case, its inclination angle is changed from the initial negative value to zero and to positive values.

The ampule container can thus store ampules to its full capacity. As the number of ampules remaining in the container decreases, the bottom plate is inclined to move ampules toward the ampule receiver. Thus, ampules are always on the ampule receiver when it rises. Ampules on the ampule receiver are arranged in order while being raised and discharged one by one.

What is claimed is:

1. An ampule feeder comprising:

an ampule container having a bottom plate that is inclinable in one direction about an axis extending along one edge of said bottom plate, said container being capable of randomly accommodating a plurality of ampules;

an ampule receiver vertically movable along a side wall of said ampule container, said ampule receiver being provided adjacent said one edge of said bottom plate and having a top surface substantially as wide as an ampule diameter for receiving ampules and arranging them in order;

a dispenser for discharging ampules on said top surface of said ampule receiver in a direction in which ampules on said top surface are arranged; and a controller for detecting ampules discharged by said dispenser and increasing an inclination angle of said bottom plate if no ampules are discharged for a predetermined time period.

2. An ampule feeder as claimed in claim 1, further comprising a structure for dropping any ampule standing upright on said ampule receiver.

3. An ampule feeder as claimed in claim 2, further comprising an ampule detector for detecting any ampule held on said dispenser.

4. An ampule feeder as claimed in claim 1, further comprising an ampule detector for detecting any ampule held on said dispenser.

5. An ampule feeder as claimed in claim 1, wherein said dispenser is incorporated in said ampule receiver.

6. An ampule feeder as claimed in claim 5, further comprising a structure for dropping any ampule standing upright on said ampule receiver.

7. An ampule feeder as claimed in claim 6, further comprising an ampule detector for detecting any ampule held on said dispenser.

8. An ampule feeder as claimed in claim 7, wherein said controller is operable to limit the inclination angle of said bottom plate to a predetermined maximum inclination angle.

* * * * *